E. C. HISCOCK.
EXHAUST REGULATING VALVE FOR PNEUMATIC PLAYER ACTIONS.
APPLICATION FILED MAR. 2, 1910.

1,051,406.

Patented Jan. 28, 1913.

Witnesses,
F. S. Mann
S. N. Pond

Inventor,
Emory C. Hiscock,
By Offield, Towle, Graves & Offield
Attys.

UNITED STATES PATENT OFFICE.

EMORY C. HISCOCK, OF CHICAGO, ILLINOIS, ASSIGNOR TO W. W. KIMBALL COMPANY, OF CHICAGO, ILLINOIS, A CORPORATION OF ILLINOIS.

EXHAUST-REGULATING VALVE FOR PNEUMATIC PLAYER-ACTIONS.

1,051,406.　　　　　Specification of Letters Patent.　　Patented Jan. 28, 1913.

Application filed March 2, 1910. Serial No. 546,809.

*To all whom it may concern:*

Be it known that I, EMORY C. HISCOCK, a citizen of the United States, residing at Chicago, in the county of Cook and State of Illinois, have invented certain new and useful Improvements in Exhaust-Regulating Valves for Pneumatic Player-Actions, of which the following is a specification.

This invention relates to pneumatic actions for mechanical piano players, and has reference more particularly to an improved vent regulating valve. As is well known, in mechanisms of this character there is commonly employed a vent-regulating valve controlling the exhaust effect of the main exhaust chamber or chest upon the tracker range and upon one side of a diaphragm, the opposite side of which is in constant communication with the main exhaust chamber and actuates a valve controlling the alternate communication of the atmosphere and the exhaust with the interior of the action-bellows. Heretofore these vent regulating valves, of which there is one for each pneumatic, have commonly consisted of a needle valve formed with a threaded stem or shank and a screw-head for purposes of nice adjustment. It has been found, however, that where such a valve is screwed into a wooden wall, or, as is sometimes done, is screwed into the threaded bore of a metallic holder or casing itself set into the wall, the valve is exceedingly liable to accidentally get out of correct adjustment through either the swelling or shrinking of the wall in which it is mounted or by reason of slip of the threaded stem in its mounting under the effect of contraction and expansion or for other causes.

My invention is addressed to the improvement of instruments of this character chiefly in the direction of rendering these valves more easily accessible for purposes of adjustment, and of rendering them more stable and reliable in action by eliminating the causes tending to accidental or automatic misadjustment; and the manner in, and means by, which these objects are effected will be readily understood from a consideration of the accompanying drawing, taken in connection with the following description thereof, setting forth one particular mechanical embodiment of the invention.

Figure 1:
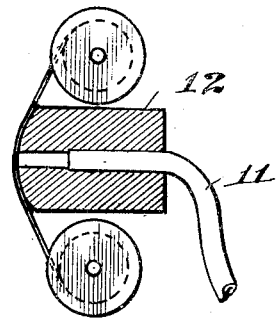
Figure 1:
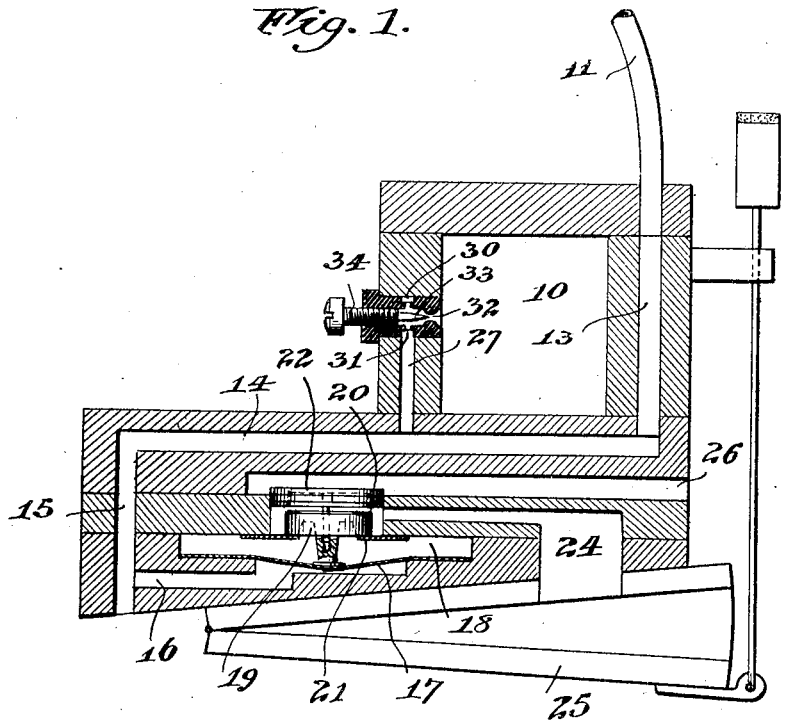
Figure 2:
Figure 3:
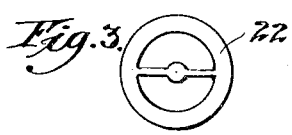
Figure 4:
Figure 5:
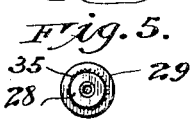

Referring to the drawing, Figure 1 designates a vertical section through the primary exhaust chest, underlying diaphragm chamber, and the tracker range of a well known form of piano player. Figs. 2 and 3 are detail side elevation and top plan views of a valve-seat member interposed in the connection between the atmosphere and the action-bellows; and Figs. 4 and 5 are, respectively, side elevational and end views of the holder or casing of my improved valve.

Referring to the drawing, 10 designates the main exhaust chamber or chest, above which pipes 11 lead to the usual tracker range 12 of the instrument. Each pipe 11 connects with a vertical duct 13 formed through the back wall of the exhaust chest 10, said duct 13 communicating with a horizontal duct 14 in the forwardly extending bottom wall of the exhaust chamber 10, and the duct 14 communicating with a vertical duct 15, the lower end of which latter communicates, by a short inwardly extending duct 16, with the lower side of a diaphragm 17 mounted in the bottom of a diaphragm chamber 18, which latter is subject to the same degree of vacuum as that existing in the exhaust chamber 10. Mounted on the diaphragm 17 is a T-shaped valve 19 which extends upwardly into a valve chamber 20 above the diaphragm chamber 18 and coöperates alternately with lower and upper valve seats 21 and 22 at the lower and upper ends of said valve chamber 20, respectively. The stem of the valve 19 is hollow and is guided on a vertical pin 23 depending from the upper annular valve seat 22. From the valve chamber 20 a duct 24 leads directly into the action-bellows 25; while, when the valve 19 is withdrawn from its upper seat 22, the upper end of the valve chamber 20 is in free communication with the atmosphere through said hollow valve seat and a horizontal duct 26 lying between the ducts 14 and 24.

The front wall of the exhaust chest 10 has a series of vertical ducts 27 that communicate at their lower ends with the ducts 14. Mounted in the front wall of the exhaust chest 10 and intersecting each of the vertical ducts 27 is a hollow valve holder or casing 28 of a generally cylindrical form having a head 29, a threaded bore, and a substantially central circumferential groove 30 lying in the vertical plane of the duct 27, with one or more radial holes 31 forming a communication between the groove 30 and the interior of the valve holder. This latter is also formed with a contracted portion forming an internal valve seat 32 at its inner end adapted to be controlled as a vent opening between the exhaust chest 10 and the duct 27 by a needle valve 33 that is formed with a screw threaded stem on shank 34 having threaded engagement with the bore of the valve holder or casing 28. This valve holder is, in accordance with my invention, made in one piece of hard rubber, or what is known as hard rubber composition, since I have determined by experiments that this material is free from contraction and expansion at ordinary room temperatures to any such extent as to displace the valve from correct adjustment, and it also grips the stem or shank of the valve under a high degree of friction, and thus prevents accidental turning of the valve therein, which is important, since the least turning of the valve will throw it out of proper adjustment, and the proper regulation of these valves is a matter of extreme nicety, requiring long experience and great skill on the part of the operator thereof. Preferably, and as herein shown, the outer surface of the body of the valve holder is toothed or milled, as shown at 35 (Figs. 4 and 5), to prevent accidental turning of the valve holder itself in the wall in which it is mounted.

In player pianos, the mechanism of the pneumatic action herein shown is usually mounted in such a way that the removal of the upper front panel of the piano case exposes the front wall of the main exhaust chest or chamber 10, whereby easy access is afforded to the valves 34 for adjustment without requiring removal of the pneumatic action or any further dismantling of the piano case. As above stated, the hard rubber composition of which the valve holder is made, by reason of its elasticity and high frictional character, and its freedom from objectionable expansion and contraction under the variations in ordinary room temperature, insures the retention of the valves in correct position when once adjusted.

I claim:

1. A vent valve mechanism for pneumatic player actions, comprising a hollow cylindrical one piece valve holder of hard rubber composition formed with an internal valve seat, a threaded bore, and a radial aperture communicating with said bore, and a needle valve having a threaded shank engaging the threaded bore of said holder and adjustable toward and from said valve seat, substantially as described.

2. A vent valve mechanism for pneumatic player actions, comprising a hollow cylindrical valve holder of hard rubber composition formed with an internal valve seat, a threaded bore, a circumferential groove, and a radial aperture connecting said groove and bore, and a needle valve having a threaded shank engaging the threaded bore of said holder, and adjustable toward and from said valve seat, substantially as described.

EMORY C. HISCOCK.

Witnesses:
SAMUEL N. POND,
LOIS FORCE.

Copies of this patent may be obtained for five cents each, by addressing the "Commissioner of Patents, Washington, D. C."